Dec. 27, 1938.  F. D. WENN  2,141,779

SAFETY EMERGENCY BRAKE LEVER

Filed Sept. 28, 1937

INVENTOR.
FLOYD D. WENN
BY Louis Illmer
ATTORNEY.

Patented Dec. 27, 1938

2,141,779

UNITED STATES PATENT OFFICE 2,141,779

SAFETY EMERGENCY BRAKE LEVER

Floyd D. Wenn, Binghamton, N. Y., assignor to The Brewer-Titchener Corporation, Cortland, N. Y., a corporation of New York Application September 28, 1937, Serial No. 166,048

5 Claims. (Cl. 74—536)

This invention relates to certain novel structural improvements and more particularly pertains to a simple, compactly assembled emergency brake lever or the like hand control for automotive or other vehicle brakes that possesses a marked degree of safety against inadvertent pawl release of a set lever subsequent to applying its associated brake. The components of my compound or bipartite lever may comprise a pair of pivotally jointed body and arm sections whose respective longitudinal axes are adapted to be relatively inclined to a limited extent about a knuckle pin. A partially concealed reciprocative pawl rod is arranged to actuate rockable detent means of the tooth engaging type, a shift in inclination of the lever sections into stopped extreme positions being respectively made to interlock the detent against rod actuation and to release the same.

The free end of the body lever section may be shaped into a grippable handle portion having a remotely located push button or an equivalent bell crank device associated therewith by which to manipulate the detent means. Said knuckle pin may be upheld as a main pivot or lever fulcrum by a fixedly mounted bracket shaped to constitute a stationary sector plate provided with a series of ratchetlike teeth disposed concentrically with respect to the axis of such fulcrum. A single detent of the balanced lever type may be carried by my arm section and have one rockable end thereof attached to the pawl rod for stepwise engagement with the sector teeth. As herein devised, a projecting toe end of the body section is extended beyond the knuckle pin and serves to positively latch the other detent end against releasing a set brake except by the deliberate successive manipulation of the lever sections in a predetermined order of events. In the present lever system, the latch elements act automatically and are devoid of any extraneous lock of the conventional type that needs to be key turned prior to the release of a restrained pawl rod.

Extended experience with remotely controlled ratchet engaging pawls has shown the need for adequately protecting the same against premature release, particularly so in the case of an automobile or truck when parked on a steep hillside in which children may be carried as front seat passengers. My compound brake lever is therefore designed to afford ample safety against being jarred or casually knocked loose while set because of some unforeseen circumstance that may result in the pawl release, which occurrence has in some instances led to disastrous consequences.

This problem has herein been solved in a simple and effective manner without interference with any functional performance normally expected of an emergency lever, the present lever locking means being especially pertinent when the pawl or tips of some ratchet teeth have become rounded by wear and tear after prolonged usage.

The instant disclosure represents a modification of the structure disclosed in my earlier application, Serial No. 145,209 as filed May 28, 1937.

The object of the present invention is to control an easily manipulated brake lever assembly of the indicated character provided with automatic safety locking means that may be compactly incorporated in automotive equipment on a low-cost productive basis.

Reference is had to the accompanying one sheet of drawings which is illustrative of a preferred layout of my brake lever, and in which:

Fig. 1 represents an elevational side view of a brake lever in locked position as taken in partial section and equipped with my improved detent devices, while

Figure 4:
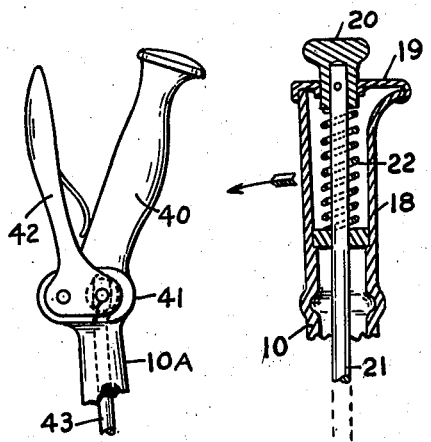
Fig. 4 shows alternative bell crank means for actuating the pawl rod.

Referring in detail to such structural disclosure my compound upright or floor type of brake lever may be embodied as a jointed bipartite type comprising a sheet metal primary or body section 10 generally having a tubular profile of which one end may be integrally forked to terminate in a pair of axially offset interlocking toes such as 11. Intermediate its ends, said body section may be mounted to rock upon the lever fulcrum or main pivot 12. Such fulcrum may be upheld by a skeletonized bracket 13 which in turn may be attached by the bolts 14 to a suitable vehicle fixture. This bracket may be apertured to allow of rotatably entering the main pivot therethrough and shaped to provide for a stationary sector plate component 15 whose arcuate perimeter may be serrated to provide for a series of ratchet or the like teeth 17 disposed concentrically about the fulcrum axis. The forked locking toes are preferably arranged to straddle the sector plate as shown.

The opposite or grippable handle end 18 of the body section may be capped at 19 and provided with an upstanding push button 20 that actuates an internally disposed pawl rod 21 against tension of the return spring 22 in a conventional manner. Said rod is carried through the body section to the detent 23 which is operatively arranged to fully engage a particular sector tooth after said push button is released. When installed in a car or truck as an upright lever, the bracket and its associated members are intended to be mounted beneath the floor board level.

Figure 1:
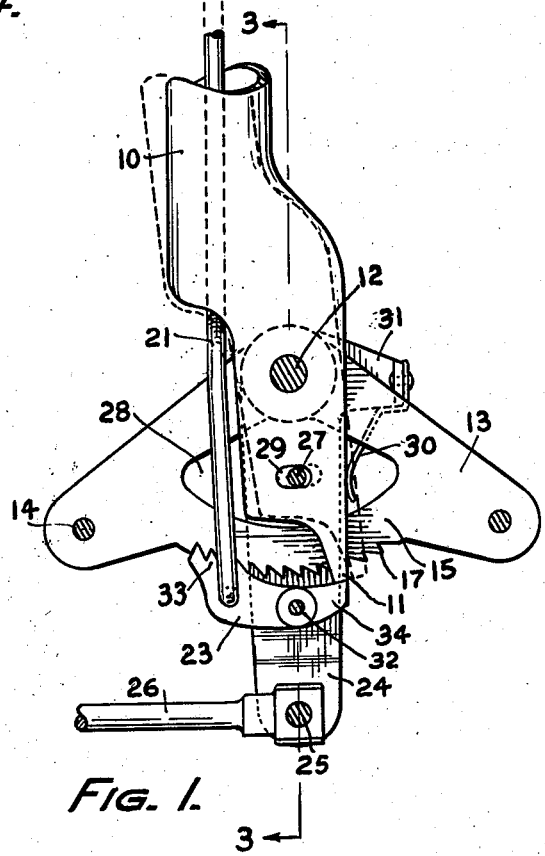

The body toes 11 are shown embraced between a pair of straplike arm sections 24 of which one such has been removed in Fig. 1 to clarify the otherwise concealed structural characteristics of my compound lever. One end of each such arm section may also be mounted on the main pivot 12, although such coincident mounting is not an essential feature in so far as these arms may as an equivalent, be likewise pivoted by the use of independent knuckle joint means. The respective opposite ends of said arms may be interconnected by a transverse pin 25 upon which to mount a stub end of the draft rod 26, which is intended to be operatively attached to the brake gear and drum (not shown).

A stop pin 27 or the like means may snugly bridge the arm sections through a triangular clearance space 28 of the bracket plate. Adjacent to its toggle pivot, the body section may be transversely slotted as at 29 to provide for a limited free tilting movement between the jointed lever sections to the extent indicated in solid and dotted outline in Fig. 1. The non-rigid mounting of the pawl rod is such as to permit of sufficient relative shift between the body and arm sections without serious binding effects. Suitable resilient means such as the mated flat springs 30 or the like may be carried by overhanging supporting lugs such as 31 formed integral with the respective arm sections whereby to yieldably press the slotted body section into engagement with the stop pin 27.

Figure 3:
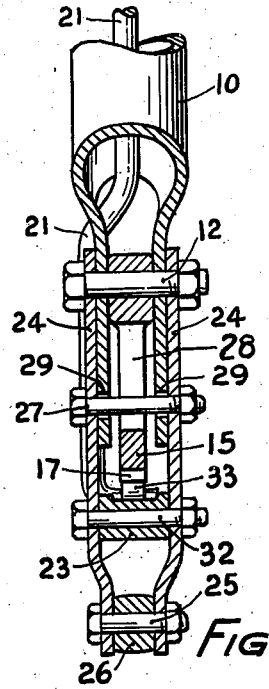
Fig. 3 depicts a sectional view as taken along 3—3 of Fig. 1.
Figure 2:
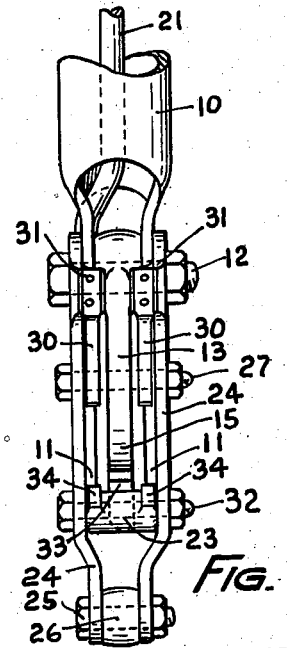
Fig. 2 is a fragmental edge view thereof.

The detent 23 is preferably of the balanced lever type mounted intermediate its ends upon the pawl pin 32 that spans the lever arm sections. The tooth engaging end 33 of said detent may be apertured for the reception of a hooked terminal of the pawl rod 21, said rod being extended through the tubular body and unobstructedly carried in offset relation alongside a body fork and arm as shown in Fig. 1. Fig. 3 cross-sectionally reveals an assembly of the lever members and it will be observed that the opposite detent end is shaped to comprise a lock bolt 34 arranged to interlock with a toe 11 when the body section and an arm section are brought into substantial axial alignment. To this end, mated lock bolts may be spaced apart lengthwise of the pawl hub so as to register with a corresponding body toe as shown in Fig. 2. The tooth engaging detent end 33 may be located between said mated locking bolts 34.

In Fig. 4 there is schematically disclosed an alternative lever handle structure equivalent to that of the remote rod control cross-sectionally illustrated in Fig. 1. The manipulative end of the lever body section 10A may be equipped with a tubular handle portion 40 provided with a slotted pivot lug 41 on which is fulcrumed the spring returned, manipulative bell crank 42. A pawl rod 43 may be carried interiorly of the body section and pivotally attached to one crank leg in a conventional manner so that an inward gripping of the other crank leg toward the handle 40, will similarly depress said rod toward the interconnected detent 23.

Assuming the working lever parts to be assembled as described, the intended mode of operation may be traced as follows:

In Fig. 1 the brake lever stands in its slackened position; to set up the brake band stepwise, the grip 18 is manually drawn toward the driver in the direction of the arrow. In the last cited figure, the detent end 33 is fully meshed with a particular sector tooth 17 and the opposite detent end 34 is interlocked with the lever toe 11; hence the mated arms 24 will be positively retained against exerting tension on the draft rod 26 until a rearward pull on the lever grip slightly inclines the longitudinal axis of the body section 10 about the knuckle joint 12 into its dotted position. The toe 11 thereby releases the detent 23 to leave it free to engage another sector tooth while setting the brakes. Upon liberation of the lever grip 18, the toothed end 33 of said detent will by draft rod tension, be drawn into mesh with a next adjacent sector tooth and the springs 30 will throw the lever body 10 into its normal full-lined position with respect to the set brake arms 24, whereupon the toe 11 automatically locks the detent in place.

In order to release the set brake, the pulled grip again cocks the body section which in turn, eases tooth thrust and also allows the push button to be unobstructedly manipulated in a conventional manner. That is to say, said push button cannot be depressed until the body and arm are first brought into their relatively inclined dotted positions. As will be evident, the alternative Fig. 4 handle structure operates in an identical manner and it is only by deliberately grasping the upstanding bell crank leg 42 toward the pulled handle 40 that a release of a locked brake setting can be effected after cocking the body section.

It is pointed out that my lever members need not necessarily be stamped up from sheet metal since the parts may be solid forged, also that the ratchet teeth may in some instances be disposed on the near as contrasted with the far side of the main lever pivot. Nor is it essential that duplicate arm sections or interlocking toes be employed, since one such may serve the same purpose. As will be understood by those skilled in this art, the disclosed improvements also find application to other than emergency brake lever uses and that various structural changes in the details and disposition thereof may be resorted to in likewise carrying out my illustrative embodiments, all without departing from the spirit and scope of my invention heretofore described and more particularly pointed out in the appended claims.

I claim:

1. A safety brake lever assembly comprising knuckle jointed arm and elongated body sections of which one end region of the last named section is grippable to manually alter the relative axial inclination of the respective sections, a main pivot mounting the body section for rocking movement, stationary sector plate means including a series of teeth disposed about the axis of the main pivot, stop means limiting the inclination of the gripped body section relative to the arm section about the knuckle joint thereof, a single detent pivotally carried by the arm section for stepwise engagement with said teeth, a draft rod attached to said arm section, a manipulative control located adjacent to the grippable portion of said body section, a pawl rod operatively interconnecting said control with the detent, and detent locking means serving to retain the engaged detent against tooth release except by a manipulation of said control while the body section is being gripped.

2. A safety brake lever assembly comprising knuckle jointed arm and body sections of which last named section one end region is grippable manually and the other end region is provided with toe means, a main pivot mounting the body section for rocking movement, stationary sector plate means including a series of teeth disposed about the axis of the main pivot, stop means limiting the inclination of the gripped body section relative to the arm section about the knuckle joint thereof when said lever is rocked in either direction, a single detent pivotally carried by the arm section for stepwise engagement with said teeth, a draft rod attached to said arm section, resilient means urging the respective sections into one extreme of relative inclination, manipulative control means located adjacent to the aforesaid one end region of the body section, and pawl rod means operatively interconnecting said control means with the detent, the completed tooth engagement of the detent being automatically locked by the body toe whenever the arm and body sections assume said one extreme inclination.

3. A safety brake lever comprising a body section that is forked at one end to terminate in toe means and the other end region of which section is provided with manipulative rod actuating means, a main pivot mounting the body section for rocking movement, stationary sector plate means interposed between said forks and which means include a series of teeth arranged about the axis of the main pivot, mated arms pivotally disposed on the respective body forks in a straddling relation to said plate means, a pawl pin bridging said arms, a detent mounted upon the pawl pin for stepwise engagement with said teeth, stop means limiting the relative inclination of the arm sections with respect to the body forks when said lever is rocked in either direction, resilient means urging the body section toward one extreme of inclination relative to the arm sections, and a pawl rod operatively interconnecting the manipulative actuating means with the detent, said toe means serving to automatically lock the detent simultaneously with a completed tooth engagement thereof.

4. A compound lever comprising a tubular body section that is forked at one end region in an offset relation to the tube axis and shaped to constitute toe means and the other end region of which section is provided with manipulative rod actuating means, an upheld main pivot disposed between said ends serving to mount the body section for a manual rocking movement, stationary sector plate means interposed between said forks and which means include a series of teeth arranged around the main pivot, an arm section having one end region mounted to turn about the main pivot into different inclinations with respect to the body axis, stop means limiting the relative inclination between said sections when said lever is rocked in either direction, a draft rod attached to the arm section, an elongated detent pivotally carried intermediate the ends thereof by the arm section and one end region of which detent is arranged to engage said teeth stepwise, and a pawl rod operatively interconnecting the actuating means with said one end of the detent, the toe means serving to automatically interlock with the other detent end region to positively retain detent engagement with a particular tooth and to release said detent by shifting the body section and the arm section into a different inclination.

5. A compound lever comprising a tubular body section that is bifurcated at one end region in offset relation to the tube axis to constitute forks of which one such is provided with interlocking toe means and the other end region of which section is provided with manipulative rod actuating means, a main pivot mounting said section between the body ends for rocking movement, stationary sector plate means including a series of teeth disposed around the main pivot, said plate means being interposed between said forks and serving to uphold the main pivot, arm means mounted to turn about the main pivot into different inclinations with respect to the body axis, stop means limiting such relative inclination when the lever is rocked in either direction, resilient means interposed between said body section and the arm means to urge the same toward one extreme of inclination, a detent pivotally carried by the arm means for stepwise engagement with said teeth and which detent is brought into cooperative relation with the body toe means, and a pawl rod operatively interconnecting the manipulative actuating means with the detent to release the same from tooth engagement, said toe means serving to automatically and positively interlock the detent against rod manipulation while the detent is engaged with a particular tooth until the body and arm means are shifted into a different inclination against the urge of said resilient means.

FLOYD D. WENN.